United States Patent

[11] 3,570,351

| [72] | Inventor | Ernst Maximilian Spengler<br>Bergen-Enkheim, Germany |
|---|---|---|
| [21] | Appl. No. | 776,516 |
| [22] | Filed | Nov. 18, 1968 |
| [45] | Patented | Mar. 16, 1971 |
| [73] | Assignee | Roeder & Spengler OHB<br>Bergen-Enkheim Hessen, Germany |
| [32] | Priority | Nov. 25, 1967 |
| [33] | | Germany |
| [31] | | R-47 443 and P16 28 904.6 |

[54] SAW FOR MACHINING A WORKPIECE HAVING A CURVED SURFACE
4 Claims, 1 Drawing Fig.

[52] U.S. Cl.............................................. 83/425,
83/411, 83/427, 143/77, 143/132
[51] Int. Cl.............................................. B26d 7/06
[50] Field of Search.................................... 83/411,
427, 425; 143/77, 78, 73, 132; 76/107

[56] References Cited
UNITED STATES PATENTS

| 142,361 | 9/1873 | Walker | 143/132(3)UX |
| 750,551 | 1/1904 | Mallonee | 143/132(3) |
| 1,291,719 | 1/1919 | Bank | 143/132(3) |
| 2,656,861 | 10/1953 | Verret | 143/73X |
| 3,280,682 | 10/1966 | Sauer | 76/107(C)X |

*Primary Examiner*—Frank T. Yost
*Attorney*—Wolfgang G. Fasse

ABSTRACT: A saw with a curved workpiece support which is rotatably, and preferably also tiltably, attached to the saw whereby workpieces having a curved surface may be machined in such a manner that the saw blade extends perpendicularly relative to the curved surface of the workpiece at all times of the machining operation.

Patented March 16, 1971 3,570,351
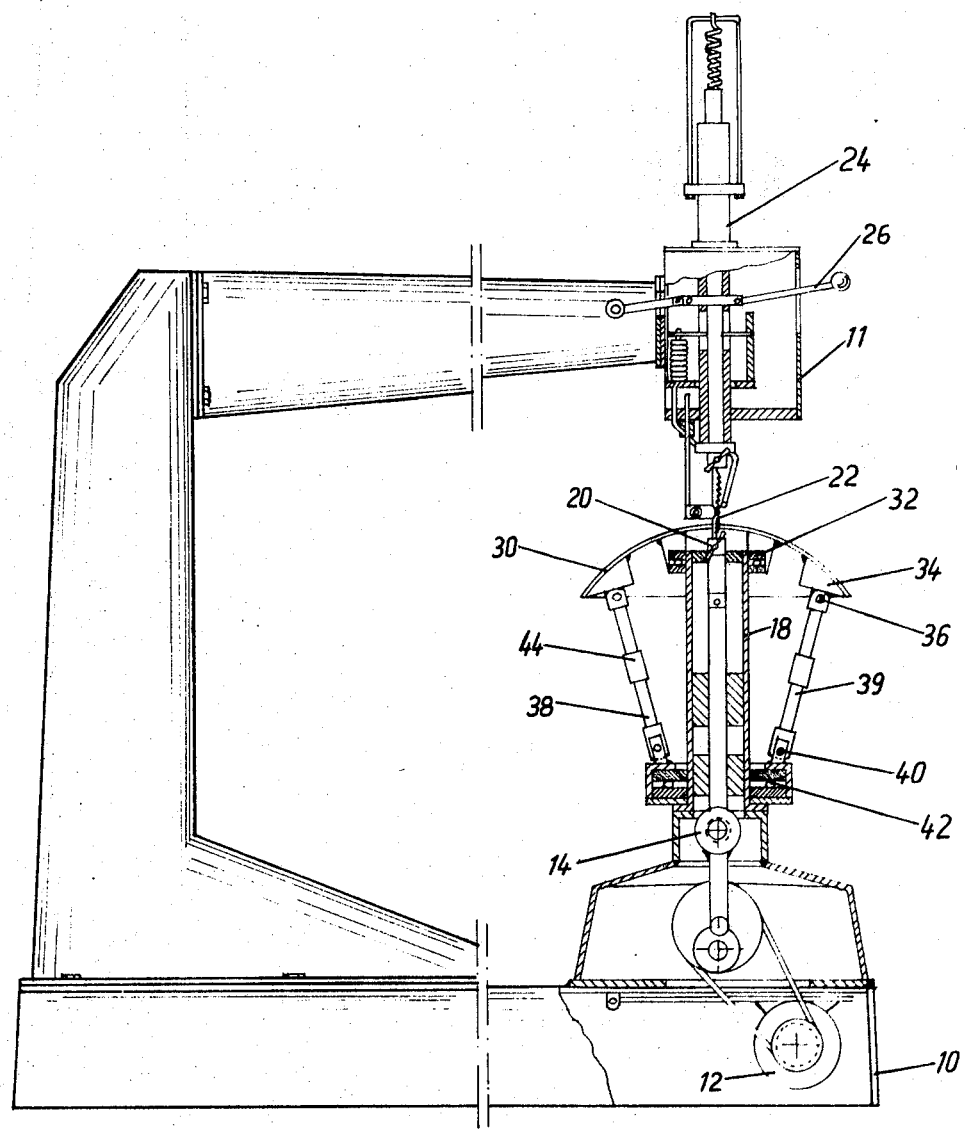

SAW FOR MACHINING A WORKPIECE HAVING A CURVED SURFACE

The present invention relates to a saw for machining a workpiece having a curved surface, more specifically, the invention relates to saws for cutting slots into curved surfaces.

It is the main object of the invention to enable the cutting of precisely located slots into curved surfaces, for example, in connection with rotary die stamping tools which employ cutting edges inserted into a cylindrical support member.

For achieving the above main object it is necessary to precisely guide the workpiece and to assure that the cutting angle between the saw blade and the workpiece surface remains constant during the cutting operation regardless of the curvature of the workpiece surface and independently of the instantaneous position of the workpiece relative to the saw blade.

Yet another object of the invention is to assure that the saw blade will extend perpendicularly relative to the surface of the workpiece during the entire cutting operation.

Still another object of the invention is to provide a rotatable workpiece support having a curved surface the curvature of which corresponds substantially to that of the workpiece.

Another object of the invention is to provide a curved workpiece support which is rotatable about an axis coinciding with the serrated cutting edge of the saw blade.

A still further object is to provide a power saw for cutting or machining curved surfaces whereby the saw itself may be a portable jigsaw or a coping saw, or a scroll saw.

The invention also aims at providing a curved workpiece support the curvature of which is adjustable relative to the direction of saw blade motion.

Yet another object is to arrange the curved workpiece support for a saw in such a manner that a support having a given curvature may be exchanged by another workpiece support having a different curvature, that is, a different radius of curvature.

Still another object of the invention is to devise mounting means for curved workpiece supports of a saw so that either the concave or the convex surface of such supports may contact the workpiece.

In order that the invention may be clearly understood it will now be described, by way of example, with reference to the accompanying drawings, wherein:

the single FIGURE illustrates a scroll saw comprising a workpiece support according to the invention.

The FIGURE illustrates, partially in a sectional view, a scroll saw comprising a base or housing 10 to which is attached by means of an upright and a horizontal arm, a machine head 11. The lower end of the upright is rigidly attached to the base. The housing 10 supports a drive motor 12 which drives a reciprocating driver rod 16 through a crank gear 14. The driver rod 16 is glidingly guided in a column 18. A saw blade 22 is connected with its lower end to the upper end of the driver rod 16 by means of a screw such as a set-screw 20. The upper end of the saw blade 22 is connected to a spring biased column 24 which is guided in said machine head 11.

The drive motor 12 may be switched on and off by means of a lever 26 in a conventional manner.

The workpiece support means comprise a curved support surface 30 which is rotatably connected to the upper end of the column 18 by means of a bearing 32, for example a roller or ball bearing one race of which is secured to the column 18 while the other freely rotatable race is secured, preferably in a journal connection, to lugs of the support surface 30. Such bearing connection permits a rotation of the support 30 about an axis extending longitudinally through the column and along the serrated edge of the saw blade 22. In addition the journal connection of the support surface 30 to the bearing 32 permits a tilting of the surface 30 perpendicularly to such axis.

In the embodiment the convex portion of surface 30 is adapted for contacting the workpiece. In any event the surface 30 may be made up of spacer members curved so that their curvature will correspond to that of the workpiece. The spacer members may be attached to a holding member such as a plate. The surface 30 may in the alternative be a continuous curved surface whereby an aperture will be provided in such surface through which aperture the saw blade extends. The holding plate provided with the spacer member will also be provided with such an aperture for the saw blade 22.

In order to secure the support surface 30 in a tilted position there are provided strut members 38 and 39. The upper end of such strut members is journaled to lugs 34 secured to the concave portion of the surface 30. The lower end of strut members 38, 39 is journaled, as by releasable bolts 40 or pivot means, to a ring mount or bearing 42. One race of such bearing or ring mount 42 is secured to the lower end of the column 18 while a rotating race is attached to said lower ends of the strut members 38, 39.

The strut members 38, 39 are adjustable in their length by means of sleeves 44 having inner threads. Adjusting the length of the strut members makes it possible to locate the center of curvature of the surface 30 precisely on the axis of rotation and to fix the surface 30 in a tilted position while simultaneously permitting the surface 30 to freely rotate about column 18.

The workpiece support surface 30 is curved to correspond to the curvature of the workpiece. Thus, where the workpiece is curved in two dimensional directions the surface 30 may have the shape of a calotte. On the other hand, where the workpiece has cylindrical shape, the surface 30 will also have a curvature corresponding to such cylindrical shape.

The dimensions of the surface 30 in longitudinal and cross direction will depend on the size of the workpiece but in any event will be selected so that even larger workpieces may be properly guided and adjusted in a large range. Stated differently, the surface 30 will usually but not necessarily be larger than the workpiece surface to be machined.

Although the invention has been described with reference to specific examples, it is intended that the invention is not to be limited to such examples but that it shall cover all modifications and equivalents within the scope of the appended claims and details may be adapted to the respective requirements within such scope of the claims.

I claim:

1. In a saw for machining a workpiece having a curved surface, a saw blade, a housing, power means in said housing for driving the saw blade, workpiece support means having a curved surface with a curvature corresponding substantially to that of the workpiece, mounting means for rotatably attaching the workpiece support means to the saw, whereby the saw blade extends perpendicularly to the curved workpiece surface at all times during a machining operation, the improvement comprising a column arranged between said mounting means and the saw housing, said mounting means comprising a bearing member for rotatably attaching the workpiece support to the upper end of said column the lower end of which is rigidly secured to the saw housing, and rotatable ring mount means attached to said column, strut means hingedly connected at one end thereof to said ring mount means and journaled at the other end to said workpiece support means, said bearing member and said ring mount means cooperating in permitting the rotation of the workpiece support means relative to said column about an axis extending longitudinally through the cutting edge of said saw blade and longitudinally through the column.

2. The saw according to claim 1, wherein the workpiece support means comprise journal means for connecting the support means to said bearing member, whereby the workpiece support means may be tilted about an axis extending perpendicularly to said axis defined in claim 1.

3. The saw according to claim 2, wherein said strut means comprise adjustable extension members for adjusting the length of the strut means whereby the workpiece support means may be fixed in any tilted position.

4. The saw according to claim 1, wherein the curvature of the workpiece support means varies along its surface whereby the curvature of the workpiece support means may be adjusted relative to the saw blade and to a workpiece by said tilting of the support means.